United States Patent [19]

Shea

[11] Patent Number: 5,492,473

[45] Date of Patent: Feb. 20, 1996

[54] LANGUAGE INSTRUCTIONAL AND FACT RECOGNITION APPARATUS

[76] Inventor: James W. Shea, 7614 York Ave., So. Edina, Minn. 55435

[21] Appl. No.: 174,708

[22] Filed: Dec. 29, 1993

[51] Int. Cl.$^6$ .................................................. G09B 19/00
[52] U.S. Cl. ........................ 434/156; 434/157; 434/167
[58] Field of Search ................................. 434/156, 157, 434/167, 170, 327, 348

[56] References Cited

U.S. PATENT DOCUMENTS

| | | | |
|---|---|---|---|
| 3,052,043 | 9/1962 | Pimentel | 434/157 X |
| 3,271,884 | 9/1966 | Roberson | 434/157 |
| 4,878,844 | 11/1989 | Gasper et al. | 434/167 X |
| 4,950,167 | 8/1990 | Harris | 434/327 X |

Primary Examiner—Gene Mancene
Assistant Examiner—Jeffrey A. Smith
Attorney, Agent, or Firm—James R. Cwayna

[57] ABSTRACT

The language instruction and fact recognition apparatus and method for teaching as well as self instruction of a language, primary or secondary, increasing vocabulary of a language and providing a fact recognition basis with self learning and self checking techniques. The apparatus provides a key or master chart having an arrangement of a single word, words or graphical representations, a plurality of cards each having primary and secondary indicia accompanied by a word, words or graphical representation corresponding to the chart on a first side thereof and a correlative word, words or graphical representation on the second side thereof with a card orientation and placement device for retaining the cards in a manner to present the first side of a card to the second side of another card.

6 Claims, 4 Drawing Sheets

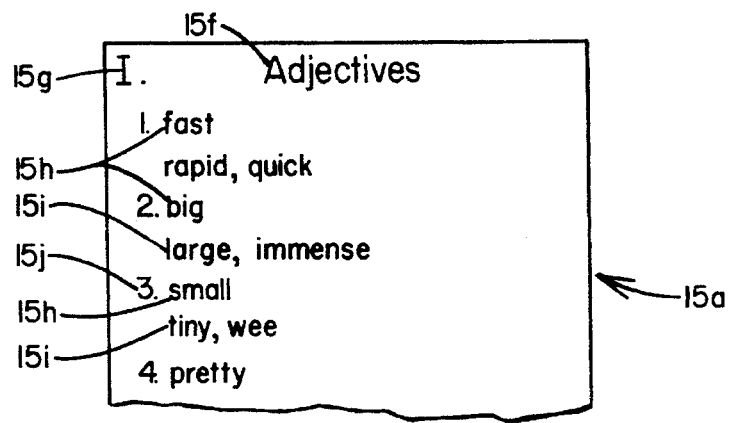
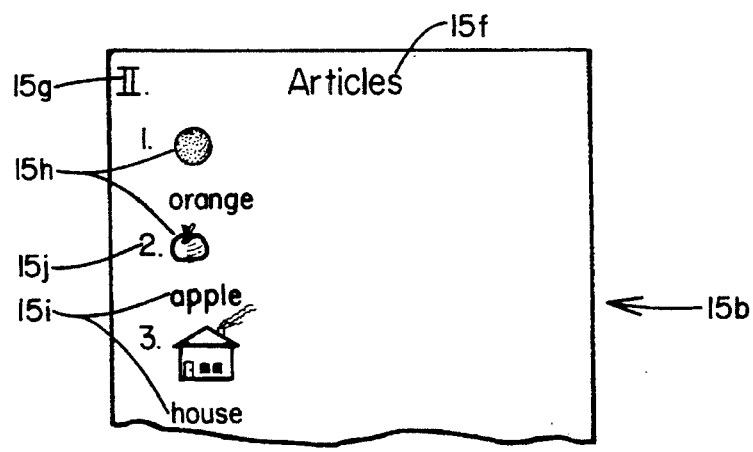
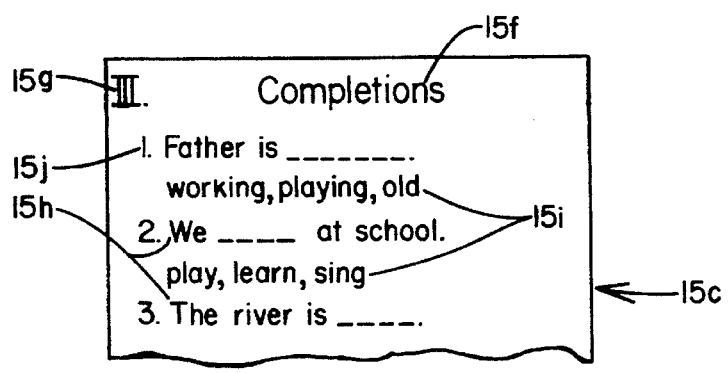

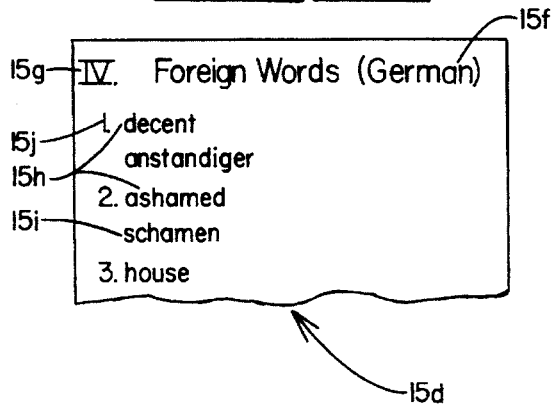
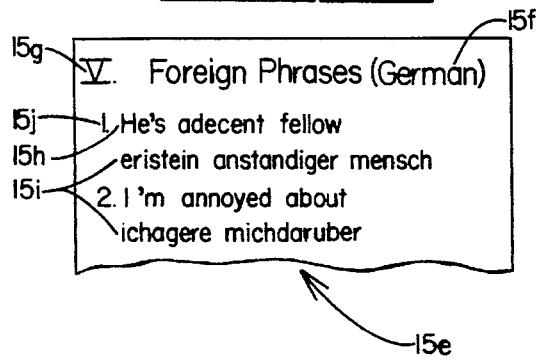
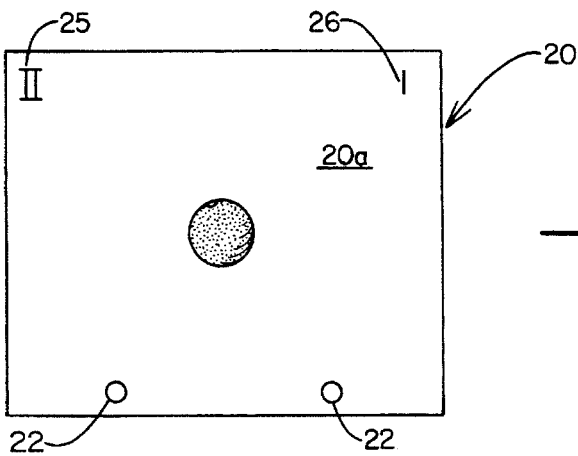
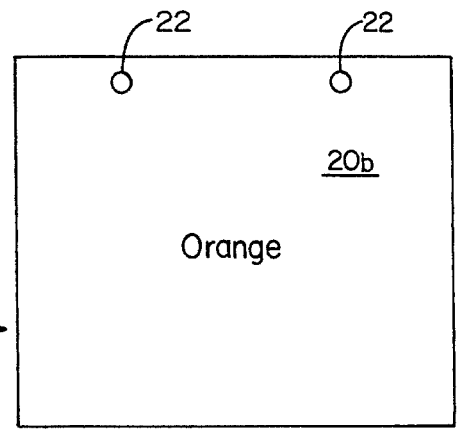
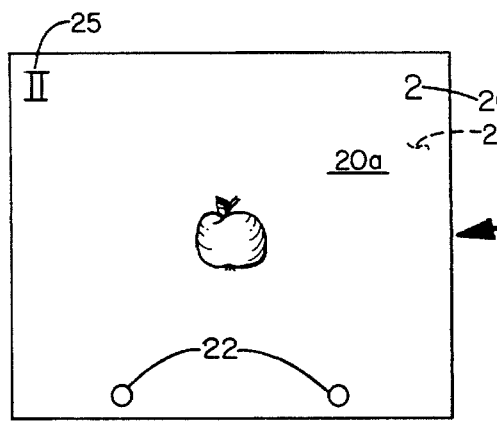

LANGUAGE INSTRUCTIONAL AND FACT RECOGNITION APPARATUS

FEDERAL SPONSORSHIP

This invention is not made under any Federally sponsored research and development arrangement nor any other research and development arrangement which should be noted.

RELATED APPLICATIONS

There are no pending applications on file by the applicant which should be considered in association with the prosecution of this application.

FIELD OF THE INVENTION

This invention relates generally to language instructional and fact recognition apparatus and methods including interaction between primary and secondary languages and more specifically to the apparatus and method by which language and fact recognition skills are taught or self learned and improved with the apparatus including a plurality of cards, one side of which is provided with primary and secondary indicia, the other side not including such indicia along with apparatus for positioning the cards in specifically related position with respect to one another. Both sides of the cards are provided with source and correlated graphics.

SHORT SUMMARY OF THE INVENTION

The method and apparatus for teaching or improving various language skills of a person either in a primary language or in and for a secondary language. The apparatus includes: a first master chart or charts, at least one set of cards and appropriate devices for holding the cards with respect to one another to provide for their correlation.

The master chart or charts consist of single words, numbers of words, words arranged in phrases, select an appropriate completing word phrases, graphical representations with words and corresponding words, phrases, etc. either in the same language or a second language which are synonyms, definitions or correlated information.

Each card obviously provides a front side and a back side. On the front of each card a master indicia and a secondary indicia is provided. Also on the front side, a word, number of words, phrase, completion word phrase or graphical representation is provided. On the opposite or back side of the card a corresponding singular word, number of words, phrase, word to complete the phrase and matching graphics or word to match the graphics is provided.

Initially, the fronts and rear of the cards are arranged on or in a holding device such that an appropriate front and back of a pair of cards are correlated and the student first becomes acquainted with the master chart and then views the card fronts and backs in their related positions. Simply with this utilization, the student will presumably learn. To test his or her learning, the cards are then removed from the holding device and the cards are placed front down on a surface, retaining one card to be arranged in the holding device with its front exposed. The student then searches the cards which have their backs exposed to find the proper matching card. When he or she selects a card, it is placed, front to back, upon the held or positioned card and if the correct card has been selected, the secondary indicia will properly correlate with the secondary indicia of the held card and this will show the student that the right "answer" has been found. This will also expose the side of the card having the primary and secondary indicia and a new word, etc. to be "answered".

If a person is attempting to increase vocabulary, the first held card could provide, for example, the primary indicia, the word to be matched, with the secondary indicia consisting of a numeral and a color. The numeral would indicate how many words of like meaning are to be found and the color would indicate that the meaning of the found word was identical to that of the questioned word. After the proper number of words were found, a new word card would be selected for the search.

Noticeably then, a student may learn by him or herself without teaching but simply utilizing the provided cards.

BACKGROUND AND OBJECTS OF THE INVENTION

Various devices have been provided for the teaching or sole learning of languages and for fact recognition, whether they be related to a primary or a secondary language. Similarly, many devices have been provided for vocabulary improvement for a primary or secondary language.

Applicant provides herein a unique method and very simple apparatus for learning a language or increasing his or her skills within a language.

With applicant's concept, the student is first exposed to the sets of words, phrases and the like. Through study thereof supposedly the student will learn the same and is easy ready for testing on learned ability. Applicant provides the apparatus for continued self exposure study and for self testing through which the student will know, through correlated indicia, if he or she has accomplished his aims of learning.

Applicant's apparatus and method includes a plurality of marked or markable cards upon which words, phrases, figures or other graphics along with primary and secondary indicia are provided on one side of the card. A second card is provided with an "answering" word, phrase, figure or correlated graphics which will provide a correct answer definition or the like to the first card but no indicia. The other side of this second card contains primary and secondary indicia and a new "question". In use, the student will ultimately test him or herself by turning the second cards to a downface position and by learned selection will make a choice of such cards and if the second selected card bears the right "answer", when it is turned over and placed upon the first card, the primary and secondary indicia will be correlated to the indicia of the first card and a new "question" is presented.

In this manner, the student may self test him or herself.

The apparatus and method is equally applicable to learning a primary language, increasing one's skills such as vocabulary growth in such language or learning a second language.

It is therefore an object of the applicant's invention to provide the apparatus and method of a language instructional and fact recognition system which is simple to use and simply expanded with the student's language growth.

It is a further object of the applicant's invention to provide the apparatus and method of a language instructional and fact recognition system which includes a plurality of facilitating cards with means for arranging and positioning the cards for their use.

It is a further object of the applicant's invention to provide the apparatus and method of a language instructional and fact recognition system which includes a plurality of cards with one side thereof bearing at least an indicia character or characters and a single word, a plurality of words, a complete or incomplete phrase or other graphic illustration indicative of a question to be answered with another card side providing an answer word, plurality of words, a matching phrase or a word to complete a phrase or a word or graphic answer to the questioning graphic.

It is still a further object of the applicant's invention to provide a language instructional and fact recognition apparatus system including a plurality of language cards with at least primary indicia thereonwhich provides a means to correlate the cards in a question and answer order whereby a student may self-test his skills in the language.

These and other objects and advantages of the applicant's invention will more fully appear from a consideration of the accompanying drawings and disclosure.

DESCRIPTION OF THE DRAWINGS

FIG. 3 is an illustration of a portion of a master chart showing a number of words with correlative words listed under each word;

FIG. 4 is an illustration of a portion of a master chart having a number of graphically illustrated articles with a definition or meaning word listed under each illustration;

FIG. 5 is an illustration of a portion of a master chart having a number of phrases having a blank or completion line for which a word must be selected with a number of words appropriate to completion of the phrase listed under each phrase;

FIG. 6 is an illustration of a portion of a master chart having a number of words of a primary language with correlated foreign words listed below each work;

FIG. 7 is an illustration of a portion of a master chart having a number of primary language phrases and a correlated foreign language phrase below each phrase;

FIG. 8 is an illustration of instruction cards which have been prepared from a master chart such as that of FIG. 4; and, FIG. 9 is an illustration of instruction cards which have been prepared from a master chart such as that of FIG. 3.

DESCRIPTION OF A PREFERRED FORM OF THE INVENTION

Figure 1:
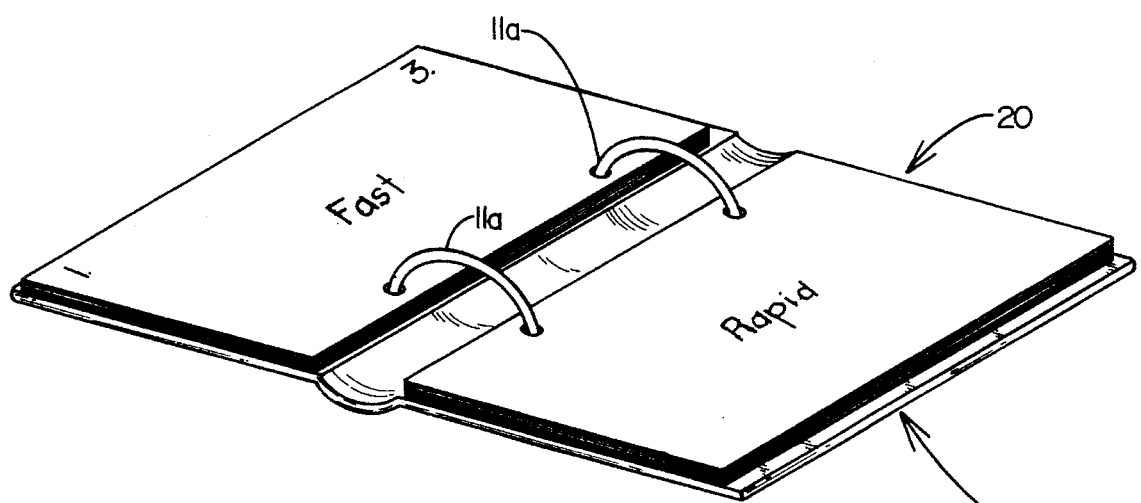
FIG. 1 is a perspective illustration of a ring-binder showing a plurality of instruction cards which may be easily removed from the binder.
Figure 2:
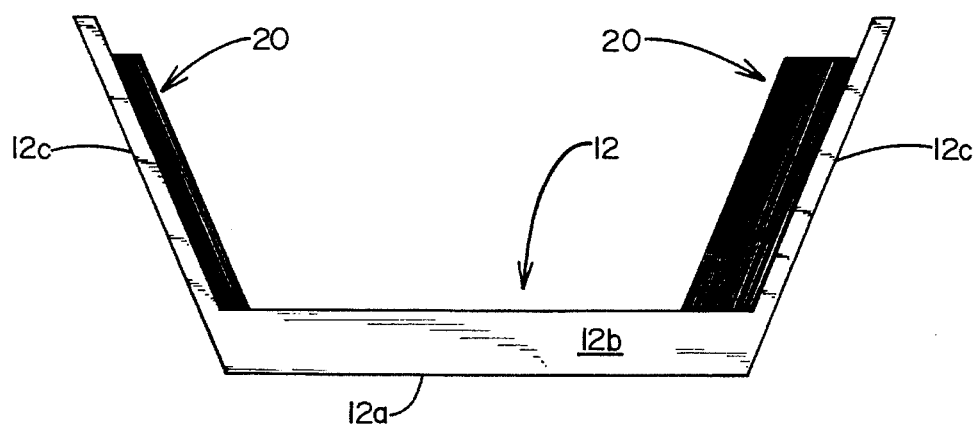
FIG. 2 is a side elevation of a card holding device having cards arranged therein.

In accordance with the accompanying drawings, applicant's concept basically includes three distinct elements which may be provided in a variety of forms without departing from the scope of the invention. These elements include a plurality of master charts, a plurality of instructional cards 20 and various holding device for removeably positioning the cards 20.

In a first form of the invention, the holding device is illustrated as a ring binder 11 with easily opened and closed ring holders 11a—11a and in a second form of the invention the holding device is illustrated as a simple open box 12 having a bottom 12a with upstanding sides 12b and conveniently arranged, angularly positioned ends 12c—12c into which the instructional cards 20 will fit. With either form of holder, the cards 20 are easily positioned and removeable and are arrangeable in face-to-face, front-to-back relation. In useage of the cards 20, both surfaces are normally utilized and in understanding the method, care must be taken to properly consider the terminology used in the description.

The master charts illustrated are provided as control charts and although a minimal number of such charts are illustrated, it should be understood that in a complete application of the invention many such charts will be available. This same is true for the plurality of cards or sets of cards 20.

As illustrated, a master chart 15a (FIG. 3) may be provided for a set of adjectives, a master chart 15b (FIG. 4) for a set of articles, a master chart 15c (FIG. 5) for a set of completions, a master chart for a set of correlated primary and second language words 15d (FIG. 6) and a master chart for a set of correlated primary and second language phrases 15e (FIG. 7). As illustrated, each master chart may be provided with a title 15f appropriate to its contents and represented by a set, a primary indicia 15g common to the set and a list of appropriate subjects or "questions" 15h which are followed by word, words, phrases or "answers" 15i. It should be noted that each of the "questions" is provided with indicia 15j which is, for the purposes of description termed secondary indicia while the set is considered as primary indicia 15g.

As there are situations when only one indicia will be utilized on a card, primary and secondary terminology is used to distinguish between the primary indicia 15g which correlates a card 20 to a master chart while the secondary indicia 15j correlates a question-answer relation.

The cards 20 each provide two surfaces, designated for description, a question side 20a and an answer side 20b. The cards 20 are established from a selected master chart and a set of cards is established for each such chart and each bearing the set or primary indicia 15g. If the ring binder 11 is utilized, the cards 20 are provided with ring passing holes 22. Obviously, if other than a ring binder is utilized and a unit which permits the roll-over of cards such as a ROLODEX (Trademark), these holes 22 will be appropriately provided.

Each card 20 question side 20a is provided with the primary indicia 25 correlated to the set indicia of the various charts. For the example of utilization as illustrated in FIG. 8, the primary indicia 25 of the cards 20 correlates to the primary indicia 15g of master chart 15b. Similarly each question side 20a of a card 20 is provided with secondary indicia 26 and, again, for the example of FIG. 8, this secondary indicia 26 is correlated to indicia 15j of the questions 15h of the master chart 15b. The answer side 20b of a card 20 does not bear any indicia.

In FIG. 8, two cards 20 are provided and illustrated are two question sides 20a and a single answer side 20b. The designations A & B provide the question and answer sides of a single card. In this example, the first undesignated card illustrates an orange on its question side 20a and has the primary or set indicia 25 and secondary indicia 26 thereon. The designated, A & B card provides the word orange on its answer side 20b and no indicia appears thereon. When, however, the orange, word answer, is placed into face relation to the orange, picture question in a ring binder 11 or box holder 12, a new picture question of an apple appears and the picture or question side 20b provides the primary 25 and secondary 26 indicia. This new apple question side 20a correlates to the second category 15j, 15h of master chart 15b. The student knows the right answer has been selected for the question, orange as the secondary indicias 26 are in sequence.

After a student has utilized the master charts and the prearranged and positioned cards, he or she is ready for or believes him or herself ready for self-testing. In self testing, the student will arrange all of the cards 20 on a surface with no indicia showing with only answer sides 20b being upwardly arranged. Turning over any card will result in a question side 20a and this question side will bear primary 25 and secondary 26 indicia. The student then searches the upwardly arranged answer sides 20b until the appropriate answer is found. Placing this side in face-to-face position with the question side of a card will result in exposure of a new question. The student will know if the proper card has been found by checking the secondary indicia 26 thereof which will be in sequence with the secondary indicia of the previous card.

It should be noted in this example, that it was not necessary to begin by either retaining the question card side marked, for example, primary indicia "1", secondary indicia "1" but that any question card side 20a could be used to begin. To accomplish this, referring to master chart 15b, the card having "house" as the answer side 20b would have the "orange" question side 20a, graphically showing the orange, along with the primary indicia "1" and secondary indicia "1". The cards then are continuously useable and it is not necessary to find a specific starting card.

Figure 9:
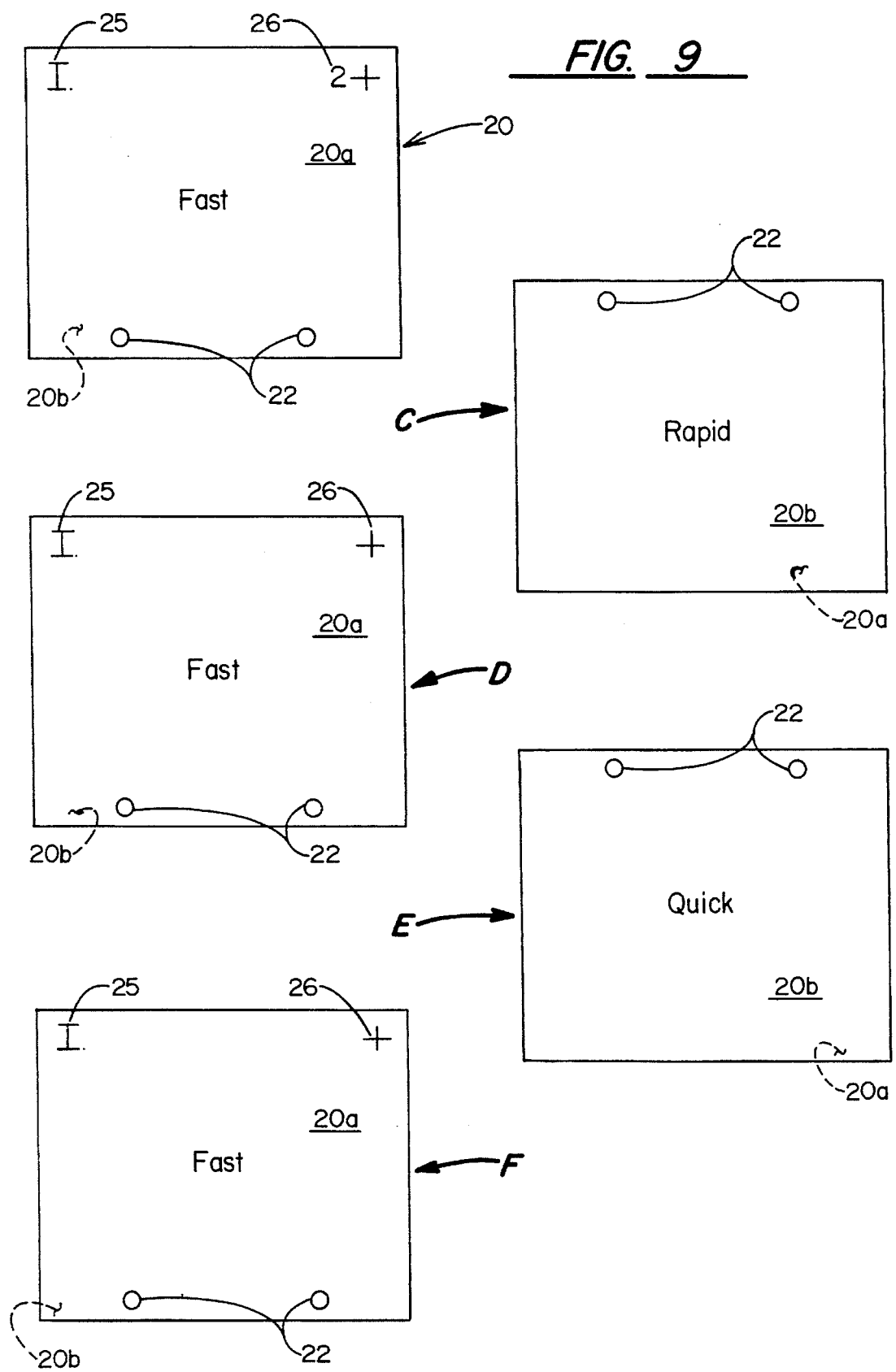

FIG. 9 illustrates the instructional aspect of the invention for vocabulary expansion. The cards 20 of FIG. 9 are correlated to master chart 15a of FIG. 3. The master chart provides the set of adjectives and utilizes the primary indicia of "1". The selected word is "fast" and is identified as the "question" with a secondary indicia of "1". There are many synonyms of the word fast and only two, rapid and quick, have been selected. In preparing the question side 20a of a card 20 the primary indicia 25 is the category "1" but a modification of the secondary 26 indicia is utilized. As illustrated, the secondary indicia 26 now consists of the numeral 2 and a "+". This informs the student that the question "fast" requires the finding of two synonym answers and each proper synonym well bear a "+" indicia. For the purposes of this illustration, the designations C & D represent the two sides to a single card and the designations E & F represent the two sides of another card. In the self-test of this multiple answer situation, it is necessary to find a question card side 20a which bears the dual secondary indicia of a numeral and a mark. When such a card is found, the student will search for cards which bear a proper answer and when such a card is selected and positioned over the properly marked card, the new question side 20a will provide the set or primary indicia "1" and the proper mark "+" and the same question word-fast. When the student finds, two such cards, a search is made for another card having a question side 20a having primary indicia 25 and secondary indicia 26 of a numeral and a mark.

In the example of FIG. 9, the undesignated card bearing "fast", primary indicia "1" and secondary indicia "2+" is positioned, for example in box 12. When the C-D card is selected, the answer side 20b, with no indicia is placed against "fast" and its question side 20b will provide primary indicia "1", secondary indicia "+" and the word "fast". Search will then locate card, having sides E, F and when the answer side 20b, "quick" is again placed on the exposed question side 20a "fast" the student will find another card bearing an "+" as secondary indicia.

The cards in this situation would not work in continuous mode and the student is required to count the proper answers found and thereafter find a new question side 20a bearing a secondary indicia 26 of a numeral and mark.

Note that the secondary indicia 26 may consist of various marks, colors, etc. without departing from the scope of the invention.

Note also that the utilization of the set or primary indicia of the master charts and the cards is for correlation purposes of various card sets and if the sets are mixed during use, separation is easily accomplished. If positive means for maintaining the cards in sets or only a single chart and set of cards were used at any one time, it would only be necessary to provide the defined secondary indicia on all question sides of any card.

As an example of this, would be the cards correlated to the chart of FIG. 4. In this instance a single word, graphic or the like would be provided on the question side 20a of the along with a single indicia such as the numeral "1" or a mark "+". The student would become acquainted with the cards properly arranged. In testing, a single question side would be selected and all other cards would be arranged on a surface, answer side up. Upon the selection of a, hopefully right, answer card, it would be placed, answer side upon question side of the previous card and a matching indicia would show a proper response and a new question side would be presented having a new indicia.

Obviously, the adjective or multiple answer example is equally used in the same manner. A proper question side 20a simply includes the multiple secondary indicia of a numeral and mark. The student becomes acquainted with the properly positioned cards and thereafter selects one with a numeral and mark and positions this card answer side 20a upward. When the proper number of "answers" are found, a new question side 20a with dual indicia is found.

Obviously, the applicant could provide examples for the instruction of foreign languages in which a single word, numbers of words or phrases are utilized but it is virtually impossible to provide for all the uses of applicant's apparatus and method for language instruction and fact recognition that could be idealized by a person skilled in the language instuctional arts being made aware of the principals contained herein.

Therefore it should be obvious that the applicant has provided a new and improved technique for the exposure of persons to a primary or secondary language which technique allows not only for teaching but for self learning and testing by the student.

What is claimed is:

1. An apparatus for language and fact recognition instruction including:

a. a plurality of instructional cards, each of said plurality of cards having a first and a second side;

b. a first graphical representation of a language element provided on said first side of each of said plurality of cards;

c. indicia provided on said first side of each of said plurality of cards;

d. a graphical representation of a correlative meaning to said first graphical representation provided on said second side of another of each of said plurality of cards;

e. means for positioning said plurality of said cards with said second side of one of said cards in face-to-face relation to said first side of another of said cards whereby said graphical representation of said second card is available for comparison to said graphical representation of said one of said cards;

f. a master chart providing a set designation; and, g. each of said plurality of cards being provided with a corresponding set designation of said first side of each of said cards.

2. The apparatus for language and fact recognition instruction as set forth in claim 1 wherein said indicia on said first side of one of said cards includes a numeral and a selected mark, and a number of said cards being provided with identical marks on said first side thereof whereby a student will recognize the selection of a properly correlated second of said cards by the mark identity.

3. The apparatus for language and fact recognition as set forth in claim 1 wherein said master chart provides:

a. a set indicia;
   b. at least one language element designation consisting of a graphical representation of the same;
   c. indicia provided for each of said language elements;
   d. each of said language elements being provided with a correlative language element;
   e. one side of each of said cards being provided with said set indicia, at least one graphical representation of a language element and said language element indicia; and,
   f. one side of another of said cards being provided with said correlative language element.

4. The apparatus for language and fact recognition as set forth in claim 3 wherein each of said indicia provided for each of said language elements includes at least a numerical indicia.

5. The apparatus for language and fact recognition as set forth in claim 4 wherein each of said indicia provided for each of said language elements includes a numerical indicia and a mark.

6. The apparatus for language and fact recognition as set forth in claim 5 wherein certain of said cards are provided with said numerical indicia and said mark and other of said cards are provided with only said mark.

* * * * *